FREQUENCY COINCIDENCE DETECTOR

Filed Oct. 18, 1957

INVENTOR
Hyman Hurvitz

United States Patent Office 3,012,200

Patented Dec. 5, 1961

3,012,200
FREQUENCY COINCIDENCE DETECTOR

Hyman Hurvitz, 1313 Juniper St. NW., Washington 4, D.C.

Filed Oct. 18, 1957, Ser. No. 691,040
20 Claims. (Cl. 328—134)

The present invention relates generally to systems for producing a readily distinguishable A.C. signal in response only to attainment of frequency coincidence of two A.C. voltages, the system having a negligible time constant and an extremely high equivalent quality factor or Q.

Briefly describing a preferred embodiment of the present invention, there is provided two sources of A.C. voltage, one of which may be fixed and the other variable so that they may be brought into coincidence. Both voltages are applied to a first mixer. Assume the first voltage to be expressed as $E_1 \cos w_1t$, and the second to be $E_2 \cos w_2t$. Voltages $E_1 \cos w_1t$ and $E_2 \cos w_2t+\theta$ are then applied to a second mixer. The outputs of the mixers are applied to an instantaneous phase detector, such as a resistance, or an additive or difference amplifier. The outputs of the respective mixers will include frequencies $E_1E_2 \cos (w_1-w_2)t$, and $E_1E_2 \cos (w_1-w_2)t\pm\theta$, the algebraic sign of $\theta$ depending on whether $w_1$ is greater than or less than $w_2$. In accordance with the invention, one of the frequencies is frequency modulated at a modulation frequency F, with a deviation D. So long as $w_1>w_2$ or $w_2>w_1$ during the frequency excursions $\theta$ will remain constant. If, however, $w_1$ is alternatively greater than and less than $w_2$, $\theta$ will shift in algebraic sign from $+\theta$ to $-\theta$ and back at the frequency F, and the changeovers will take place precisely as $w_1$, and $w_2$ pass through coincidence. The phase detector will then have an output at frequency 2F, i.e., one output pulse for each coincidence of $w_1$ and $w_2$. F may be made sufficiently smaller or greater than $w_1+w_2$, so that 2F may be readily selected by a broad band filter at the output of the phase detector to the exclusion of any possible combination of $w_1$ and $w_2$.

A system of the type above briefly described may be designed to have an effective Q of the order of 400,000. At the same time, since no narrow band circuits are employed, rise and decay of output signal frequency may be substantially instantaneous.

The output signal of frequency F consists of sharp pulses, occurring precisely at coincidence of $w_1$ and $w_2$, so that pulses may be generated at precisely determined times, for large values of D. D may be only a fraction of a cycle per second, however.

Where one of $w_1$ and $w_2$ is to scan or sweep past the other, the frequency F and deviation D may be sufficiently great that at least four or five coincidences of $w_1$ and $w_2$ can occur during a scan, to give the selection filter at frequency 2F sufficient time to respond. The latter filter may be made sufficiently wide to respond fully in the indicated time, i.e., in response to four or five cycles of input.

It will be clear, where the values of $w_1$ and $w_2$ are high so that desired absolute accuracy of measurement required is relatively low in c.p.s., that F may be quite low, i.e., lower than the desired absolute accuracy. For example, for a 100 mc. signal where accuracy to 5,000 c.p.s. is required, F may be less than 500 c.p.s. In general, a suitable value of F depends on the band over which $w_1$ and $w_2$ may vary, and the absolute accuracy required of the system.

In a broad sense, the present invention is a filter, and in another sense a frequency converter. In either case it has the extremely valuable properties that (1) it may be of extremely high equivalent Q, (2) its responsive band-width is readily adjustable by adjusting D, (3) its pass frequency, say $w_2$, is readily adjustable by adjusting a reference frequency, say $w_1$, (4) its response time or time constant may be made extremely small. In another sense, the system constitutes a device for generating extremely accurately spaced or timed pulses under control of an A.C. voltage.

It is, accordingly, a broad object of the present invention, to provide a novel frequency responsive device having high effective Q but short time constant.

It is another object of the present invention to provide a device for accurately comparing two frequencies.

It is a further object of the present invention to provide a system for generating accurately timed pulses.

It is still another object of the invention to provide a system for indicating when two frequencies have attained a predetermined frequency difference, the latter selectable at will.

The above and still further objects, features and advantages of the present invention will become apparent upon consideration of the following detailed description of one specific embodiment thereof, especially when taken in conjunction with the accompanying drawings, wherein.

Figure 1:
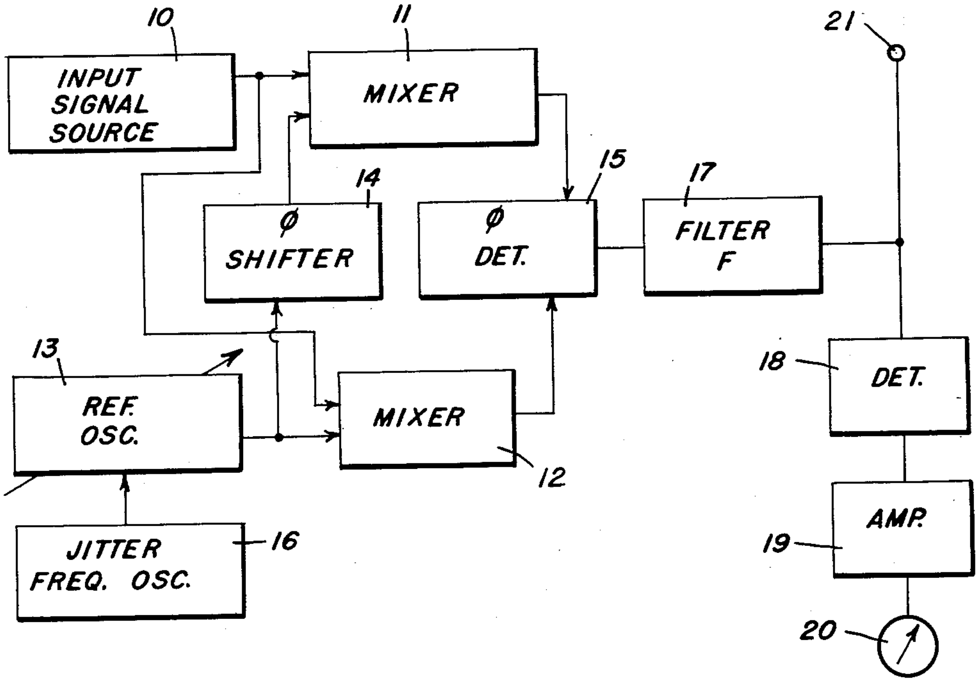
FIGURE 1 is a block diagram of a system according to the invention.

Referring now more specifically to the accompanying drawings, and more particularly to FIGURE 1 thereof, reference numeral 10 indicates a source of input frequency, which for the purpose of the present exposition may be assumed to include only a single frequency, although each of a multiplicity of simultaneous frequencies may be separately measured. The output of the input signal source 10 is applied in parallel to the mixer 11 and to the mixer 12. While the mixers 11 and 12 may be balanced if desired, this is not essential to the practice of the invention. It is desirable, however, that the mixers 11 and 12 have equal voltage responses. The phase of the signals derived from the input signal source 10, as applied to the mixers 11 and 12, may be zero. A further oscillator 13 is provided, the output of which is applied directly to the mixer 12 and via a phase shifter 14 to the mixer 11. The outputs of the mixers 11 and 12 are compared as to phase in a phase detector 15 which is of the type which responds instantaneously to the applied signals, and which does not require or permit integration. A typical example of a phase detector of this character is a simple difference amplifier. A further example of such a phase detector is a simple resistance across which two signals may be added or subtracted, since it is well known that when two signals of different phase are added or subtracted, their resultant has an amplitude which is a function of the instantaneous difference in phase.

The oscillator 13 is modulated in respect to frequency or phase, or its output is so modulated, by means of the frequency shift modulator 16, in response to a jitter frequency source of frequency F. The total deviation D, which may be introduced in the output of the oscillator 13, is a matter of choice, depending upon the results desired by the practice of the present invention, as will become apparent hereinafter. The output of the phase detector 15 can be shown to consist of the frequency 2F, or of pulses of repetition rate 2F, which may be selected by means of a filter 17 having a center frequency 2F and sufficient bandwidth to accept the pulses applied thereto with substantially no delay. This implies that the filter 17 has relatively wide band width, and consequently an extremely short time constant. The precise band width employed is a function of the characteristics desired of the equipment. The output of the filter 17 may be applied to a detector 18 and in turn to an amplifier 19, the output of which may be indicated on a meter 20. In the alternative, and for some purposes, the output of the filters 17 may be utilized directly and for this purpose may be applied to an output terminal 21.

It can be shown that as long as the signal supplied by the source 10 is above the frequency applied by the oscillator 13, and despite the frequency modulation of oscillator 13, the difference frequencies generated by the mixers 11 and 12 will have a phase of one algebraic sign, equal to the phase introduced by the phase shifter 14, which we specify as $\theta$. However, this phase will change in algebraic sign according as the output of the source 10 is above or below the output of the source 13 in frequency Jitter in the frequency of output of oscillator 13 does not affect this consequence of the circuitry, unless and until the frequency excursions involved in the jitter pass the frequencies of the sources 10 and 13 through coincidence. In the latter case a rapid shift of phase equal to $2\theta$ occurs for each passage through coincidence, and since the passages through coincidence occur at twice the frequency F of the jitter source 16, and are instantaneously detected by the phase detector 15, they pass through the filter 17 and may be detected and indicated or may be applied to an output terminal and utilized directly.

The deviation D thus produced in the output of oscillator 13 by the jitter source 16 may be extremely slight, and may be extremely great, as desired. In fact, the jitter frequency may extend to only a fraction of a cycle per second, if desired. It then follows that if the input signal 10 is of unknown frequency and if the oscillator 13 is a reference oscillator adjustable as to frequency, the frequency of the reference oscillator 13 may be adjusted until output is indicated at the meter 20, in which case it will be known that the frequency of the reference oscillator 13 is periodically intersecting the frequency of the input signal supplied by source 10. Since the jitter may be extremely small, it is implied that the accuracy of the system, frequency-wise, may be extremely great, and in fact, tests have indicated the accuracy of the system to be well within one part in 400,000.

If, however, the jitter frequency source 16 supplies extremely wide deviations in frequency, then pulses will be supplied to the filter 17 at predetermined points of the signal of frequency F, and these points (say zero points) will be selected to a high degree of accuracy, so that accurately spaced extremely short pulses may be generated. If $w_1=w_2$, these points will be the zero points of F. The pulses supplied to the filter 17 are always the same polarity, so that the detector 18 is desirable in order to present signals which are integratable in a D.C. meter 20, or for application to any other signal indicating device which requires D.C., if the filter 17 has a center frequency 2F.

It will be obvious that the system of FIGURE 1 constitutes a device for producing an output indication whenever two signals are within some predetermined distance of each other frequency-wise. This distance may be determined by the extent of frequency excursion D of the oscillator 13. If the system be considered analogous to a filter the pass band of the filter may be thus very readily adjusted over an extremely wide range. Furthermore, considering the system as a filter the effective Q of the system may be made very great, considering the effective Q to represent $\Delta F/F$, where F is the input frequency, and $\Delta F$ is the deviation therefrom for which the response of the system drops substantially to zero or to some other predetermined value.

Despite the fact that the system is extremely selective, the time required for the system to respond to coincidence of signals is insignificant. The present system accordingly presents results which have heretofore always been considered incompatible, i.e., extremely narrow pass band with extremely short time constant.

Still further the system considered as a filter is extremely readily tuned, since tuning requires merely adjustment of the reference oscillator 13. The system is accordingly far more flexible than any other system having even approximately equal selectivity. An excellent crystal filter, for example, might have a selectivity as high as 30,000 or 40,000, whereas the present system is approximately ten times more selective.

Figure 2:
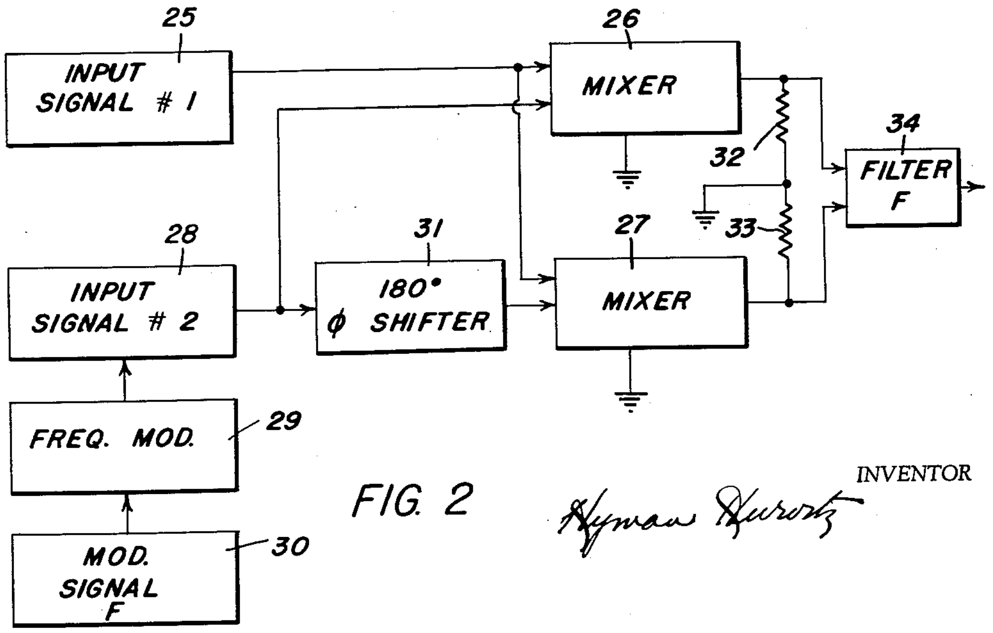
FIGURE 2 is a simplified form of the system of FIGURE 1.

Referring now more particularly to FIGURE 2 of the accompanying drawings, I have illustrated a simplified embodiment of the present invention, corresponding generally to the system of FIGURE 1 of the accompanying drawings.

In the system of FIGURE 2 the source 25 provides an input signal No. 1 which may be considered to be of unknown frequency. This signal is applied in the same phase to mixers 26 and 27. A further input signal No. 2, of controllable frequency, is supplied by input signal source 2, indicated by the reference numeral 28. The source 28 may be a tunable oscillator if desired. The frequency of the tunable oscillator 28 is modulated by means of a frequency modulator 29 in response to a signal of frequency F, supplied by a modulation source 30. Signal No. 2 is supplied directly to the mixer 26 and via a 180° phase shifter or phase reverser 31 to the mixer 27. The outputs of the mixers 26 and 27 are applied each across a different one of resistances 32 and 33, the junction of which is grounded, and the total output across both resistances 33 and 32 is selected by a filter 34 which passes the frequency F. The output of the filter 34 is then the output of the system, which may be employed as in FIGURE 1.

The use of a 180° phase shifter is particularly valuable in the present application because it implies that if when the frequency of signal No. 1 is above that of signal No. 2, the relative phase of the outputs of the mixers 26 and 27 is +180°, for the reverse frequency relation it will be −180°. Accordingly, the signal developed across the resistances 32 and 33 at the frequency F, will vary between zero and twice the output of the single mixer. This gives an extremely strong, and in fact a maximum, output for the system of the present invention.

One problem which exists in systems of the present type is that the frequency F must be so selected that it can be distinguished from other frequencies generated in the system due to either one of the input signals or to heterodyne product of the two input signals. This may be readily accomplished in the case of low frequency signals by making the frequency F quite high. For example, if the input signal 28 were known to be within the audio band, i.e., between say 5 c.p.s. and 20,000 c.p.s., the frequency F may be selected at about 120,000 c.p.s. If on the other hand, the input frequencies are extremely high it is entirely feasible to make the frequency F, quite low, i.e., lower than the absolute value of the accuracy to which measurement is required. For example, if the input frequencies were of the order of 1,000 mc. no harm could be done if the frequency F were several hundred cycles, since there would be no purpose in measuring a frequency of 1,000 mc. to an accuracy of 100 cycles.

The system may also be used for measuring frequencies of pulsed carriers. In the latter case, the frequency deviation D must be selected to be sufficiently great relative to the scan rate to produce a plurality of cycles at the frequency 2F during each pulsed carrier. Otherwise, the filter 17 will receive no signal to which it is uniquely responsive. However, even one passage through coincidence of two frequencies is sufficient to produce a pulse output from the system.

It will be appreciated that if sharp pulses are required at the output of the system, the filter of frequency 2F must be a broad filter, since broad filters are required in order to transmit extremely short pulses without distortion. However, the output of the system may be sinusoidal if the filter of frequency 2F is made sufficiently narrow. Of course, in the latter case the time constant of the entire system will be reduced, since the limiting factor of the system in such case will be the time constant of the filter of frequency 2F.

While I have illustrated the present system as involving a local oscillator the frequency of which is jittered or frequency modulated, this is not essential to the system. It is entirely feasible to frequency or phase modulate an input frequency, as by means of a single side band frequency shifting device, if desired. Similarly, the output of the local oscillator may be frequency or phase modulated by means of a frequency shifting device rather than by means of the conventional type of modulator. The advantage of so proceeding is that extremely high modulating frequencies may be introduced, and without requiring an oscillator which is capable of being so modulated. For some purposes, for example, the local oscillator, as 28 in FIGURE 2, may desirably be a crystal controlled oscillator. Such oscillators are difficult to frequency modulate over any but a very small band. In such case, frequency shift modulation may be resorted to. Systems for frequency shift modulation are well known in the art, and accordingly no further reference thereto is made.

Since the present system requires only the difference conversion product, and not the carrier nor the sum conversion product, the unnecessary frequency components may be filtered out of the mixer outputs. Similarly, if the mixers have D.C. components in their outputs, these may be readily removed by filtering, if desired. However, it will be noted that all components other than the pulses of repetition rate 2F balance out in the resistances 32, 33, since whether $w_1<w_2$ or $w_2<w_1$ the relative phase of the outputs to resistances 32, 33 is 180°. The shift from +180° to −180° involves passage through 0°, which provides pulsed outputs.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. In combination, a first mixer, a second mixer, a first source of first signal of frequency $f_1$, a second source of second signal of frequency $f_2$, means for applying said first signal and said second signal to said first mixer, means for applying said first signal and said second signal to said second mixer, means for relatively displacing the phase of at least one of said signals as applied, respectively, to said first and second mixers, means for periodically shifting the frequency of one of said signals above and below the frequency of the other at a rate F cycles per second, a phase detector coupled to said first and second mixers for detecting the relative phases of the outputs thereof, and means for detecting the component of frequency F in the output of said phase detector.

2. The combination according to claim 1, wherein said relative shift of phase is 180°.

3. The combination in accordance with claim 1, wherein F is greater than $f_1$ or $f_2$ by a factor of at least 2.

4. The combination according to claim 1, wherein F is smaller than $f_1$ or $f_2$ by a factor of at least 1,000.

5. The combination according to claim 1, wherein F is smaller than $f_1$ or $f_2$ by a factor of at least 100,000.

6. The combination according to claim 1, wherein said phase detector is a difference computing device.

7. The combination according to claim 1, wherein said phase detector is a resistive network.

8. A source of first signal of frequency $f_1$, a source of second signal of frequency $f_2$, means responsive to said first and second signals for generating further signals of relative phase $+\theta$ or $-\theta$, according as the algebraic sign of $f_1-f_2$ is positive or negative, means for varying the relative frequencies $f_1$ and $f_2$ so that $f_1-f_2$ is alternately positive and negative at a frequency F, a phase detector responsive to said further signals, and means for detecting the frequency F in the output of said phase detector.

9. In combination, a source of signal of first frequency, a source of signal of second frequency, a first mixer means for obtaining a first beat frequency signal from said first frequency signal and said second frequency signal, a second mixer means for obtaining a second beat frequency signal from said first and second frequency signals, means for causing one of said beat frequency signals to lag or lead the other of said beat frequency signals in phase depending on the relative frequency values of said first and second signals, means for varying the said relative frequency values periodically by varying one of said frequency values to be alternately above and below the other of said frequency values at a further frequency, whereby to produce a periodic alternate relative lag and lead in phase of said beat frequency signals at said further frequency, and instantaneous phase detector means responsive to said first and second beat frequency signals for detecting the frequency of said alternate relative lead or lag in phase.

10. In combination, a source of first signal having a first frequency, a source of second signal having a second frequency, means for modulating the frequency of said second signal over a spectrum sufficiently wide to include the frequency of said first signal and at a predetermined modulating frequency, means for generating two further signals by heterodyning of said first and second signals, means for generating relative phase changes of two further signals only in response to each passage through frequency coincidence of said first and second frequencies, and means for detecting said phase changes.

11. The combination according to claim 10 wherein said phase change involves a change of algebraic sign.

12. The combination according to claim 10 wherein said modulating frequency has a finite frequency difference from either of said first and second frequencies.

13. The combination according to claim 10 wherein said last means includes a phase detector and a filter connected in cascade with said phase detector, said filter having a response frequency integrally related to F, where F is said modulating frequency.

14. In combination, a source of a first signal, a source of a second signal, means for modulating the frequency of one of said signals into and out of coincidence with the frequency of the other of said signals repetitively at a frequency F, means for generating a pulse in response to each passage through coincidence of said signals, and frequency selective means for detecting said pulses.

15. The combination according to claim 14 wherein said last means includes a filter having a pass band excluding the frequencies of said signals and including a frequency integrally related to said frequency F.

16. In combination, a source of a first signal of frequency $f_1$, a source of a second signal of frequency $f_2$, means responsive to said first and second signals for generating a third signal having an only two valued characteristic dependent for its value on whether $f_1-f_2$ is algebraically positive or negative, and means for periodically modulating the frequency of at least one of said first and second signals sufficiently to effect periodic variations of value of said two valued characteristics.

17. The combination according to claim 16 wherein said characteristic is phase of said third signal.

18. In combination, a source of first signal at frequency $f_1$, a source of second signal at frequency $f_2$, means for modulating the frequency $f_2$ over a range including $f_1$, means for generating in response to the signal at frequency $f_1$ and the frequency modulated signal $f_2$ a third signal of frequency $f_2-f_1$, and means for generating a characteristic response in said third signal only for each reversal of algebraic sign of $f_2-f_1$ during the modulation of frequency $f_2$.

19. The combination according to claim 18 wherein the modulation of the frequency $f_2$ is periodic.

20. In combination, a source of a first signal of frequency $f_1$, a source of a second signal periodically sweeping in frequency $f_2$ over a range of values including $f_1$, means responsive to said signals for generating a response of frequency $f_2-f_1$, or $f_1-f_2$ having alternative fixed phase values depending on the relative magnitudes of $f_1$ and $f_2$, and means for detecting sudden changes of said phase from one to the other of said values at the frequency of said periodic sweeping.

References Cited in the file of this patent

UNITED STATES PATENTS

| | | |
|---|---|---|
| 2,474,253 | Jacobsen | June 28, 1949 |
| 2,558,100 | Rambo | June 26, 1951 |
| 2,561,182 | Crane | July 17, 1951 |
| 2,570,858 | Rajchman | Oct. 9, 1951 |
| 2,595,263 | Ingalls | May 6, 1952 |
| 2,731,566 | Chalhaub | Jan. 17, 1956 |
| 2,835,802 | Day | May 20, 1958 |
| 2,851,658 | Howson | Sept. 9, 1958 |

FOREIGN PATENTS

| | | |
|---|---|---|
| 749,038 | Great Britain | May 16, 1956 |